United States Patent [19]
Trethewey

[11] Patent Number: 5,405,112
[45] Date of Patent: Apr. 11, 1995

[54] SUCTION CUP RELEASE ASSEMBLY

[76] Inventor: Brig E. A. Trethewey, 4238 N. 68th Pl., Scottsdale, Ariz. 85251

[21] Appl. No.: 179,117

[22] Filed: Jan. 10, 1994

[51] Int. Cl.⁶ .................................... A45D 42/14
[52] U.S. Cl. ................... 248/205.8; 248/362; 248/363
[58] Field of Search ............... 248/206.5, 205.8, 205.5, 248/205.6, 205.8, 206.2, 206.3, 683, 362, 363; 294/64.1

[56] References Cited

U.S. PATENT DOCUMENTS

| | | | |
|---|---|---|---|
| 1,104,252 | 7/1914 | Dunham | 294/64.1 X |
| 1,158,005 | 10/1915 | Richards . | |
| 1,883,791 | 10/1932 | Jewell . | |
| 2,157,563 | 5/1939 | Pethick | 294/20 |
| 2,212,755 | 8/1940 | Solomon | 294/64 |
| 2,243,106 | 5/1941 | Limbert | 294/20 |
| 2,287,576 | 6/1942 | Solomon | 294/64.1 |
| 2,556,003 | 6/1951 | Sandall et al. . | |
| 2,634,998 | 4/1953 | Flower | 294/20 |
| 2,777,141 | 1/1957 | Nye | 248/205.8 X |
| 2,886,277 | 5/1959 | Boham et al. | 248/206 |
| 3,344,626 | 10/1967 | Spangler | 248/205.8 X |
| 3,879,005 | 4/1975 | Flick | 248/206 R |
| 4,846,429 | 7/1989 | Scheurer et al. | 248/205.8 |
| 4,932,701 | 6/1990 | Cornillier | 294/64.1 |
| 5,020,754 | 6/1991 | Davis et al. | 248/206.3 |
| 5,080,309 | 1/1992 | Ivins | 248/205.8 |
| 5,087,005 | 2/1992 | Holoff | 248/205.8 |
| 5,176,357 | 1/1993 | Hobart | 248/683 |

Primary Examiner—J. Franklin Foss
Attorney, Agent, or Firm—Cahill, Sutton & Thomas

[57] ABSTRACT

A suction cup, having a centrally located boss for penetrably engaging an aperture in a sheet of material, has a cap mounted upon the boss to retain the sheet of material in place. A lever extends from the cap and supports one end of a strap, which strap has its other end in engagement with and extending from the perimeter of the suction cup. Upon pivotal movement of the lever and commensurate bending of the edge of the suction cup, the vacuum maintained by the suction cup adjacent to a supporting surface is relieved.

21 Claims, 3 Drawing Sheets

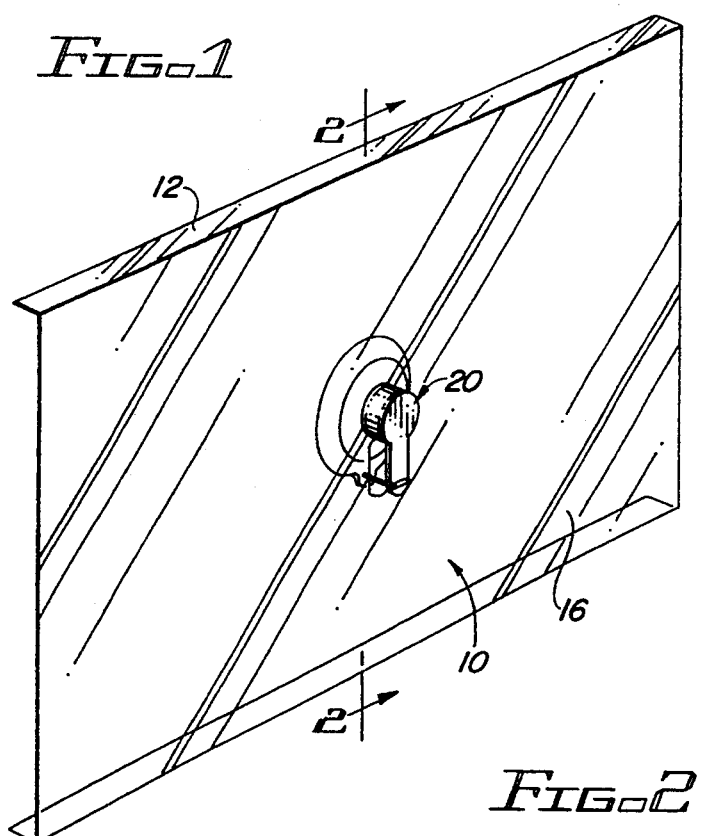
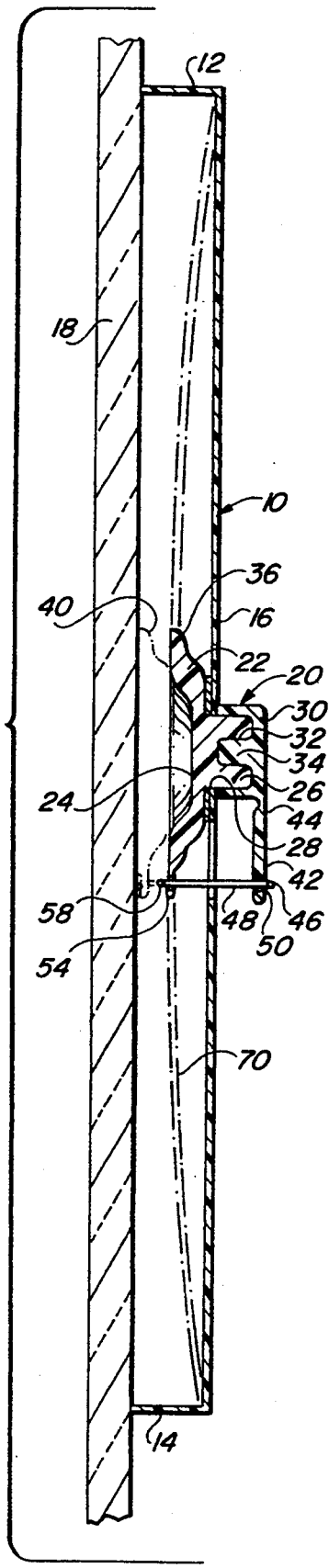
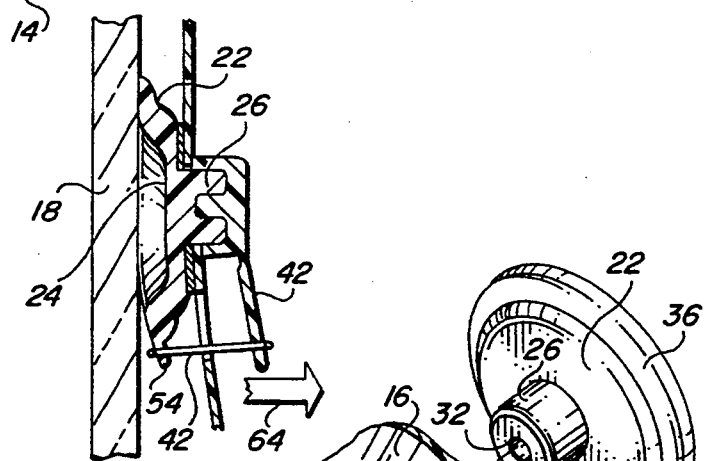
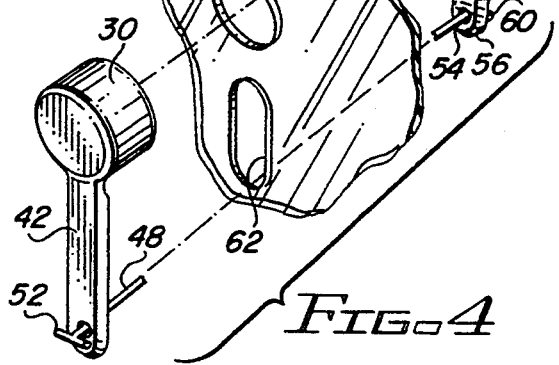

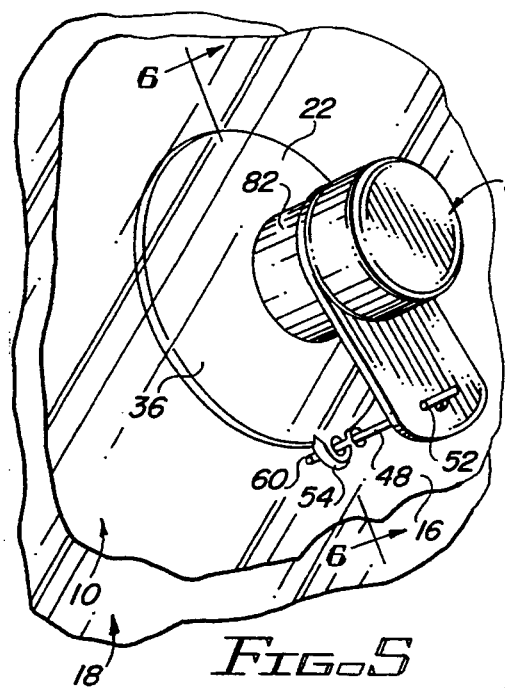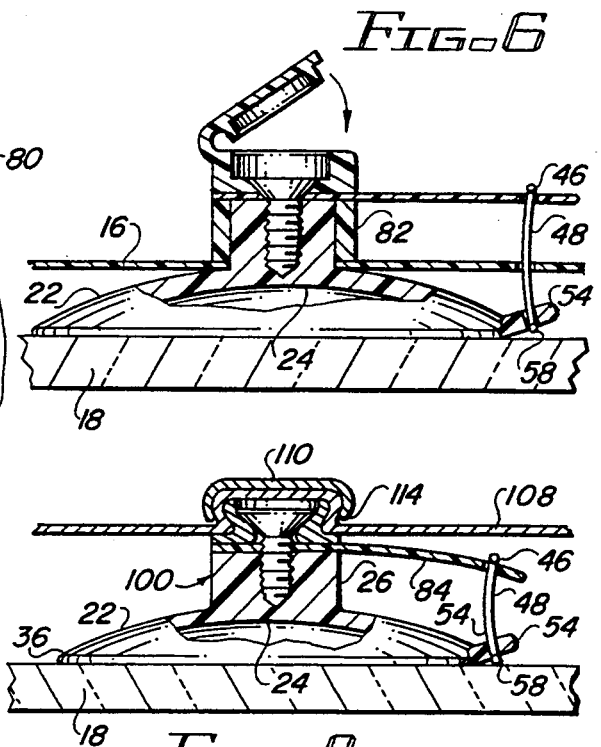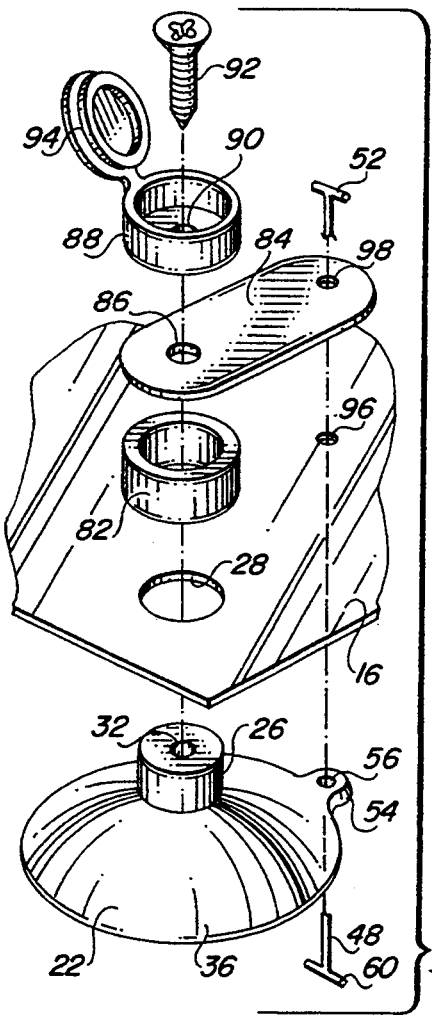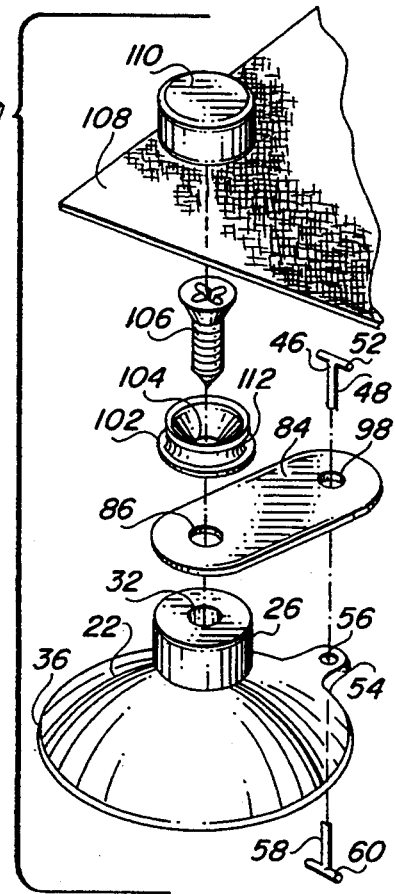

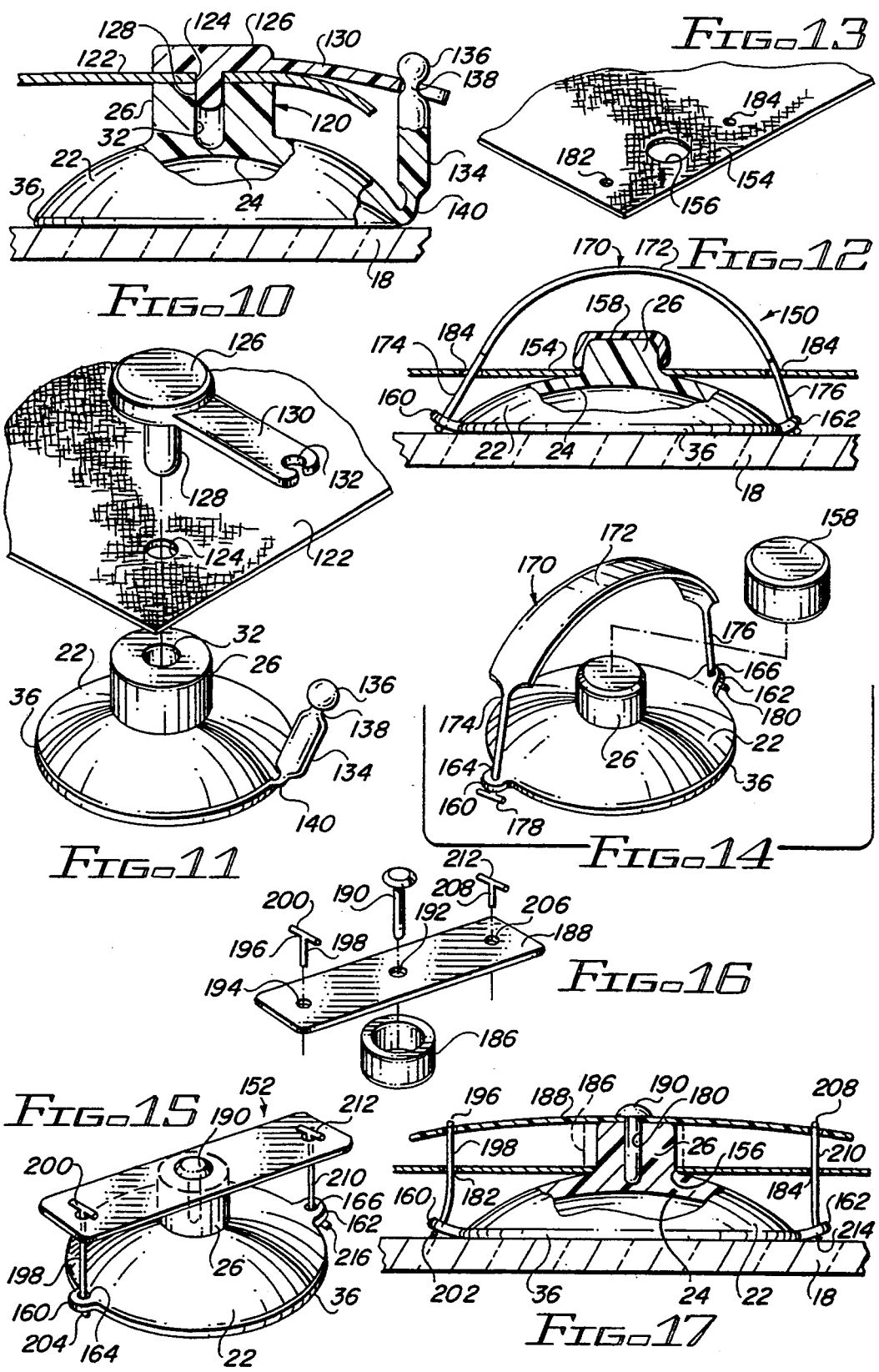

SUCTION CUP RELEASE ASSEMBLY

BACKGROUND OF THE INVENTION

1. Field of the invention

The present invention relates to suction cups and, more particularly, to release mechanisms for suction cups.

2. Description of the Prior Art

Suction cups have been used for decades for innumerable purposes to secure an element to a relatively smooth impermeable surface. Such suction cups generally include a centrally located boss extending from the cup portion to which is attached, directly or indirectly, the element to be retained in place by the suction cup. To disengage the suction cup from the surface to which it is attached, it is necessary to relieve the vacuum developed within the cup upon forcing the cup against the surface. Most often, such relief is obtained by tilting or otherwise forcing the boss laterally which causes the edge of the cup to be raised sufficiently to break the perimeter seal attendant the cup and thereby relieve the vacuum created. To reduce the amount of lateral bending or rocking of the suction cup boss, apparatus has been developed which raises the perimeter of the suction cup as a function of lateral movement of the boss to relieve the vacuum. A number of devices having apparatus separate and apart from the boss for raising the perimeter of the suction cup also exist.

SUMMARY OF THE INVENTION

Suction cups perform the primary function of temporarily retaining an element adjacent an impermeable smooth surface. To achieve this retention function, a boss extends from the suction cup for penetrably engaging an aperture in the element to be retained, such as a sheet of material. A cap, engaging the boss, secures the element in place upon the boss. A lever extends laterally from the cap for supporting a depending strap connected to the perimeter of the suction cup. Upon pivotal movement of the lever away from the surface, the commensurate translation of the strap will cause the perimeter of the suction cup to be raised. Such raising of the perimeter will relieve the vacuum present and the suction cup and attached element may be dismounted from the surface.

It is therefore a primary object of the present invention to provide a release mechanism for relieving the vacuum maintained by a suction cup mounted upon a surface.

Another object of the present invention is to provide a suction cup mounted lever for raising the perimeter of the suction cup.

Yet another object of the present invention is to provide a suction cup mounted lever for translating a strap to temporarily distend the perimeter of the suction cup.

Still another object of the present invention is to provide a suction cup having a boss for penetrably supporting an element, a boss mounted cap for retaining the element in place and a lever extending from the cap for translating a strap to distend the perimeter of the suction cup.

A yet further object of the present invention is to provide apparatus for releasing a suction cup mounted upon a smooth surface by distending the perimeter of the suction cup in response to rectilinear translation of a strap depending from a suction cup mounted bendable lever.

A still further object of the present invention is to provide a method for releasing an element supporting suction cup from a mounting surface.

These and other objects of the present invention will become apparent to those skilled in the art as the description thereof proceeds.

BRIEF DESCRIPTION OF THE DRAWINGS

The present invention may be described with greater specificity and clarity with reference to the following drawings, in which;

FIG. 1 is a perspective view illustrating a shield detachably attachable to a surface with a suction cup;

FIG. 2 is a cross-sectional view taken along Lines 2—2, as shown in FIG. 1;

FIG. 3 is a partial view illustrating operation of the suction cup release mechanism;

FIG. 4 is an exploded perspective view illustrating the apparatus for mounting sheet material upon the suction cup;

FIG. 5 is a perspective view illustrating first variant of an element supporting suction cup mounted upon smooth surface;

FIG. 6 is a cross-sectional view taken along Lines 6—6, as shown in FIG. 5;

FIG. 7 is an exploded view illustrating the first variant of the suction cup mounted lever;

FIG. 8 illustrates a second variant for securing sheet material to a suction cup;

FIG. 9 is an exploded view illustrating the second variant shown in FIG. 8;

FIG. 10 is a cross-sectional view illustrating a third variant of the lever related mechanism;

FIG. 11 is an exploded view illustrating the apparatus shown in FIG. 10;

FIG. 12 illustrates a fourth variant of the lever related mechanism for distending opposing sides of a suction cup;

FIG. 13 illustrates the apertures to be formed in sheet material to be supported by each of the suction cup apparatus shown in FIGS. 12, 14, 15 and 17;

FIG. 14 is a perspective view of the fourth variant shown in FIG. 12;

FIG. 15 illustrates a variant of the lever related mechanism shown in FIG. 12;

FIG. 16 is a partial perspective view of the lever shown in FIG. 15; and

FIG. 17 is a partial cross-sectional view of the variant shown in FIG. 15.

DETAILED DESCRIPTION OF THE PREFERRED EMBODIMENTS

Referring to FIG. 1, there is illustrated a transparent colored sheet 10 of material for use as a sun shade adjacent a window or the like. Sides 12 and 14 may be folded toward the window to provide some rigidity to sheet 10 and to space central portion 16 away from the adjacent window by a distance equivalent to the width of the side walls. Moreover, such spacing accommodates the depth of suction cup assembly 20 disposed between central portion 16 and the adjacent window.

Referring jointly to FIGS. 1, 2, 3 and 4, details attendant the structure and operation of suction cup assembly 20 will be described. The suction cup assembly includes a suction cup 22 having a cavity 24, which cavity is collapsed to perform the vacuum retention function and retain the suction cup in place against an impermeable smooth surface, such as window 18. A boss 26 extends from the suction cup. Central portion 16 of sheet 10 includes an aperture 28 for penetrably receiving boss 26 to locate the central portion adjacent the suction cup. A cap 30 is force fit upon boss 26 to retain central portion 16 of sheet 10 secured to the suction cup. Boss 26 may include a cavity 32 for receiving a pin 34 extending from cap 30.

To mount sheet 10 adjacent window 18, cap 30 is gripped to locate the sheet at the appropriate position by placing the edges of sides 12 and 14 against the window. Thereafter, pressure is applied to cap 30 to force suction cup 22 against the window to evacuate the air from within cavity 24. The resulting position is illustrated by dashed line 40 illustrated in FIG. 2. Perimeter 36 of the suction cup will bear against the smooth surface of the window and prevent inflow of air into cavity 24. Thus, the vacuum formed within cavity 24 will cause the suction cup to be maintained in place. It is to be understood, in fact, that atmospheric pressure acting upon the exterior surface of suction cup 22, being greater than the pressure within cavity 24, will force the suction cup to be retained in place. However, for purposes of the present description, the more common terminology reciting the vacuum as retaining the suction cup in place will be used.

To disengage suction cup assembly 20 from window 18 and to remove sheet 10, the vacuum within cavity 24 must be relieved. Such relief can be accomplished by forcing boss 26 laterally until perimeter 36 of suction cup 22 is mechanically forced out of contact with window 18. The lateral motion necessary for boss 26 to perform this function may, in fact, cause irreversible bending or damage to sheet 10. To effect a more elegant release of the suction cup assembly, a lever 42 extends from cap 30 via a living hinge 44, or similar pivot-accommodating mechanism; the lever and cap may be formed as a monolithic unit as illustrated. End 46 of a strap 48 is inserted through aperture 50 in the lever and retained in place by crossbar 52 at end 46. A tab 54, having an aperture 56, extends from perimeter 36 of suction cup 22. End 58 of strap 48 penetrably engages aperture 56 and is retained in place by crossbar 60 of the strap. An aperture 62 is formed in central portion 16 in general alignment with the end of lever 42 and tab 54 to accommodate passage and translation of strap 48.

By raising strap 42 response to movement of lever 42, as depicted by arrow 64 shown in FIG. 3, the strap will be translated longitudinally. Such translation will draw tab 54 away from window 18 and perimeter 36 of suction cup 22 will become disengaged with the surface of the window. Upon such disengagement, the vacuum within cavity 24 will be relieved. The resulting equalization of pressure on opposed sides of suction cup 22 will permit disengagement of suction cup assembly 20 from window 18 and sheet 10 may be removed from a position adjacent the window.

Strap 48 may be of the type sold by Dennison Manufacturing Co. of Farmington, Mass. under the trademark Buttoneer tag. A tool for attaching such tag is disclosed in U.S. Pat. No. 3,470,834.

As particularly illustrated in FIG. 2, central portion 16 may be somewhat bowed, as depicted dashed line 70 shown in FIG. 2, upon attachment of the suction cup assembly to window 18. Such bowing will tend to urge the edges of sidewalls 12 and 14 against the window and preclude fluttering and/or vibration of sheet 10 due to wind, etc. The amount of bowing of central portion 16 is primarily a function of the width of one or both of sidewalls 12, 14 in combination with the thickness of the suction cup assembly between central portion 16 and window 18 when suction cup 22 is flattened.

Referring jointly to FIGS. 5, 6 and 7, a variant 80 of suction cup assembly 20 will be described. Elements common with suction cup assembly 20 will be provided common reference numerals. Boss 26 of suction cup 22 penetrably engages aperture 28 of central portion 16 of sheet 10. A collar 82 is disposed about boss 26 and bears against central portion 16 to retain it adjacent suction cup 22. A lever 84, which may be a flexible plastic slab as illustrated, rests upon the upper sidewall of collar 82 and the upper surface of boss 26. The lever includes an aperture 86 in alignment with cavity 32. A cup 88 rests upon lever 84 and aperture 90 disposed in the base of the cup is aligned with aperture 86. A machine screw 92, or the like, penetrably engages apertures 90 and 86 and threadedly engages cavity 32 to draw cup 88 against lever 84, which lever urges collar 82 against central portion 16 to retain the central portion adjacent suction cup 22. A top 94 may be employed to close cup 88. End 58 of strap 48 is in penetrable engagement with aperture 56 of tab 54 at perimeter 36 of the suction cup. Bar 60 of the strap prevents inadvertent withdrawal of the strap. The strap extends through aperture 96 in central portion 16 into penetrable engagement with aperture 98 in lever 84. Bar 52 at end 46 prevents disengagement with the lever.

After variant 80 has been mounted upon window 18 to secure sheet 10 adjacent the window, it may be dismounted by relieving the vacuum within cavity 24. Such relief is accomplished by bending lever 84 upwardly to translate strap 48 longitudinally. The upward movement of the strap will urge tab 54 upwardly and result in upward distention of perimeter 36 of suction cup 22. Upon sufficient distention of the perimeter, ambient air will flow between the perimeter and glass 18 into cavity 24 and relieve the vacuum. Thereafter, sheet 10 and attached variant 80 may be removed from window 18.

Referring jointly to FIGS. 8 and 9 there is shown a variant 100 particularly useful in conjunction with a sheet of material which is of fabric or is otherwise highly flexible. As certain components of variant 100 are common with suction cup assembly 20, the same reference numerals will be used for such common elements. Moreover, even though window 18 is identified, it is to be understood that this element is not necessarily a window but may be representative of some other type of structure or surface. Variant 100 includes a suction cup 22 supporting a boss 26. A lever, which may be like lever 84 illustrated in FIGS. 5, 6 and 7, is supported upon boss 26 with aperture 86 in alignment with cavity 32. A keeper 102, having an aperture 104, is placed upon lever 84 in general alignment with aperture 86. A machine screw 106, or the like, penetrably engages aperture 104 in keeper 102 and aperture 86 in lever 84 for threaded engagement with cavity 32. Thereby, the keeper secures lever 84 adjacent boss 26. Strap 48 interconnects the lever with tab 54 by ends 46 and 58 penetrably engaging apertures 98 and 56, respectively, as discussed above.

A sheet 108 of flexible material, such as a fabric, is draped over keeper 102 and secured there against by a cap 110. Keeper 102 includes an undercut 112 and cap 110 includes a radially inwardly extending lip 114 for engagement with the annular indentation. The locking engagement between cap 110 and keeper 102, as illustrated in FIG. 8, retains a segment of sheet 108 there between to secure the sheet to variant 100.

As will be noted by inspection, lever 104 may be located beneath fabric 108. To effect release of suction cup 122, sheet 108 must be forced downwardly and slightly about the lever to permit gripping of the lever and pivoting the lever upwardly. Such upward pivotal movement will result in translation of strap 46 to raise tab 54. As tab 54 rises, perimeter 36 will be raised from window 18 and ultimately the vacuum within cavity 24 will be relieved to permit removal of variant 100 and attached sheet 108. In the event variant 100 is located adjacent an edge of sheet 108, it may be oriented to place lever 84 lateral of the edge of the sheet to permit direct gripping of the lever.

Referring jointly to FIGS. 10 and 11, variant 120 of suction cup assembly 20 will be described. Elements common with suction cup assembly 20 will be given the same reference numerals. Boss 26 of variant 120 extends upwardly from suction cup 22 and includes cavity 32. Sheet 122 of material to be retained by the variant includes an aperture 124. A cap 126 includes a prong 128 for penetrable engagement with aperture 124 and cavity 32. Preferably, the relative dimensions of the prong and cavity are such that a friction fit is formed therebetween to retain the cap in place with respect to boss 26. A lever 132 may formed as part of cap 126 and extends laterally therefrom. The lever includes necked down indentation 132. A strap 134 extends from perimeter 36 of suction cup 22 and includes a ball 136 supported upon a stalk 138 extending from the strap. Preferably, the strap is attached to perimeter 36 by a flexible hinge 140. As particularly illustrated in FIG. 10, lever 130 is secured to strap 134 by mechanical retentive engagement of stalk 138 within indentation 132. As the size of ball 136 is greater than the width of the indentation, it will not be drawn through the indentation upon exertion of upward pressure upon the lever. Variant 120 is mounted by placing sheet 122 upon boss 26 with aperture 124 in alignment with cavity 32. Prong 128 of cap 126 is penetrable engaged with aperture 124 and cavity 32. Thereafter, stalk 138 is press fit within indentation 132.

In operation, the variant 120 is secured to a smooth impermeable surface, such as window 18, by pressing upon cap 126 to force the flattening of suction cup 122 and reduction in size of cavity 24 to establish a vacuum therein. To release variant 120 from the surface upon which it is mounted, lever 132 is pivoted upwardly by bending it. Such upward pivotal movement will result in longitudinal translation of strap 134. Upward translation of the strap will result in raising of perimeter 36 and the vacuum within cavity 24 will be relieved.

Under certain circumstances and depending upon the size of the suction cup, it may be beneficial to relieve the vacuum from either of opposed sides of the suction cup of a suction cup assembly or the vacuum may be relieved from opposed sides simultaneously.

Referring jointly to FIGS. 12 to 17, further variants 150 and 152 are illustrated. Elements common with previously described suction cup assemblies will be assigned common reference numerals. In variant 150, shown particularly in FIGS. 12 and 14, suction cup 22 includes perimeter 36 and boss 26. Sheet 154 of material, which may be relatively stiff, flexible or limp, includes an aperture 156 for penetrably receiving boss 26. A cap 158 grippingly engages boss 126 to force material 154 adjacent suction cup 22 at the base of boss 26 and retain the sheet in place. Perimeter 36 includes a pair of diametrically opposed tabs 160, 162 having apertures 164, 166, respectively, formed therein. A strap 170 having a handle portion 172 and strap portions 174, 176 interconnect tabs 160, 162, which strap serves the function of the lever described above. Strap portion 174 includes bar 178 disposed at its end to prevent withdrawal through aperture 164. Similarly, strap portion 176 includes a bar 180 to prevent withdrawal through aperture 166. Sheet 154 includes aperture 182 for penetrably receiving strap portion 174 and aperture 184 for penetrably receiving strap portion 176.

Variant 150 is mounted upon an impermeable smooth surface, such as window 18, by pressing upon cap 158 to flatten suction cup 122 and evacuate cavity 24. The resulting vacuum will retain the variant in place and provide support for sheet 154. To relieve the vacuum, strap 170 is pulled away from window 18. The application of such pulling force will result in translation of strap portions 174, 176 to raise tabs 160, 162. As these tabs rise, perimeter 136 attendant the tabs will be raised off window 18 and the vacuum within cavity 24 will be relieved. Thereafter, variant 150 of the suction cup assembly may be dismounted. It is to be understood that strap 170 may be manipulated to act upon only one of tabs 160, 162 by translating only the respective strap portion.

Referring jointly to FIGS. 15, 16 and 17, details attendant variant 152 of a suction cup assembly will be described. Suction cup 22 supports a boss 26 having a cavity 180 formed therein. Sheet 154 of material (see FIG. 13), whether stiff, flexible or limp, includes an aperture 156 for penetrably receiving boss 26. To retain the sheet positionally fixed upon the boss adjacent the suction cup, a collar 186 may be force fitted upon the boss to retain the sheet adjacent suction cup 22. A flexible bar 188 is secured to the top of boss 26 by a peg 190 penetrably engaging aperture 192 into a friction fit with cavity 180; which bar serves the function of the lever described above. Alternatively, the peg may be replaced by a screw in threaded engagement with the cavity. In the alternative, sheet 156 may be placed on top of boss 26 and retained in place by bar 188 and peg 190 penetrably engaging a reduced diameter version of aperture 156. Bar 188 includes an aperture 194 for penetrable engagement with end 196 of strap 198, which end may include a transverse bar 200. End 202 of the strap is in penetrable engagement with aperture 164 of tab 160 and may include a further bar 204 to prevent withdrawal through aperture 164. A further aperture 206 in bar 188 accommodates penetrable engagement of end 208 of strap 210 and a bar 212 may be formed at the end to prevent withdrawal through aperture 206. End 214 of strap 210 is in penetrable engagement with aperture 166 of tab 162. This end may also include a bar 216 to prevent withdrawal through aperture 166. Straps 198, 210 penetrably extend through apertures 182, 184, respectively in sheet 154 (see FIG. 13).

To mount variant 152, perimeter 36 of vacuum cup 22 is placed adjacent an impermeable smooth surface, such as window 18. By exerting pressure upon peg 190 and the underlying boss, suction cup 22 will be flattened and air will be expelled from within cavity 24 to create a vacuum therein. To dismount variant 152, either or both ends of bar 188 may be raised. The raised end(s) of the bar will result in translation of the attached strap(s). The translated strap(s) will raise the respective tab(s) to distend perimeter 36 of the suction cup and relieve the vacuum within cavity 24.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A suction cup release assembly for retaining apertured sheet material adjacent a smooth surface, said assembly comprising in combination:
   a) a suction cup for retaining said assembly adjacent the smooth surface, said suction cup including a boss extending therefrom for penetrable engagement with an aperture of the sheet material;
   b) a cap for retaining the sheet material upon said boss of said suction cup;
   c) a lever extending from said cap;
   d) a strap depending from said lever and extending to a point of attachment proximate the perimeter of said suction cup, said strap being rectilinearly translatable in response to movement of said lever to distend the perimeter of said suction cup and release said suction cup from the smooth surface.

2. The apparatus as set forth in claim 1 wherein said lever is bendable.

3. The apparatus as set forth in claim 1 wherein said lever is pivotable.

4. The apparatus as set forth in claim 1 wherein said lever and said cap are a monolithic unit.

5. The apparatus as set forth above in claim 1 wherein said lever includes an aperture and said suction cup includes an apertured tab extending from the perimeter of said suction cup and wherein one end of said strap penetrates the aperture of said lever and is retained by a first bar and the other end of said strap penetrates the aperture of said tab and is retained by a second bar.

6. The apparatus as set forth in claim 1 wherein said suction cup is disposed on one side of said sheet and said lever is disposed on the other side of said sheet.

7. The apparatus as set forth in claim 6 wherein said sheet includes an aperture for accommodating passage of said strap therethrough.

8. The apparatus as set forth in claim 1 wherein said strap is an integral part of and extends from the perimeter of said suction cup, said strap including a ball terminated stalk for engagement by said lever.

9. The apparatus as set forth in claim 8 wherein said lever includes a necked down indentation for receiving said stalk.

10. The apparatus as set forth in claim 1 wherein said supporting means comprises a cap for retaining a portion of the sheet intermediate said base and said cap.

11. A suction cup release assembly for retaining sheet material adjacent a smooth surface, said assembly comprising in combination:
   a) a suction cup for retaining said assembly adjacent the smooth surface;
   b) means for supporting the sheet material upon said assembly;
   c) a lever said lever extending from opposed sides of said suction cup;
   d) means for mounting said lever upon said suction cup; and
   e) a pair of straps depending from said lever and extending to respective points of attachment proximate the perimeter of said suction cup, said straps being rectilinearly translatable in response to movement of said lever to distend the perimeter of said suction cup and release said suction cup from the smooth surface.

12. A suction cup release assembly for retaining sheet material adjacent a smooth surface, said assembly comprising in combination:
   a) a suction cup for retaining said assembly adjacent the smooth surface;
   b) means for supporting the sheet material upon said assembly;
   c) a lever; and
   d) means for mounting said lever upon said suction cup, said mounting means comprising a pair of straps portions, of said lever extending from opposed sides of said suction cup.

13. A suction cup release assembly, said assembly comprising in combination:
   a) a suction cup having a perimeter and including a boss;
   b) a cap mountable upon said boss;
   c) a lever extending from said cap, said lever being repositionable relative to said cap and said suction cup; and
   d) a strap interconnecting said lever and the perimeter of said suction cup for displacing the perimeter of said suction cup upon repositioning of said lever.

14. The apparatus as set forth in claim 13 wherein said lever is repositioned by bending.

15. The apparatus as set forth in claim 13 wherein said lever is repositioned by pivotal movement relative to said cap.

16. The apparatus as set forth in claim 13 wherein said strap is rectilinearly translatable in response to movement of said lever.

17. The apparatus as set forth in claim 13 wherein said suction cup, said lever and said strap are mechanically connected but separate and distinct elements.

18. A suction cup assembly comprising in combination:
   a) a suction cup having a perimeter;
   b) a first strap in engagement with one part of said perimeter;
   c) a second strap in engagement with another part of said perimeter; and
   d) means interconnecting said first and second straps for urging translation of at least one of said first and second straps to distend the corresponding part of said perimeter.

19. The suction cup assembly as set forth in claim 18 wherein said urging means is secured to said suction cup.

20. The suction cup assembly as set forth in claim 18 including means for securing sheet material to said suction cup.

21. A suction cup release assembly, said assembly comprising in combination:
   a) a suction cup having a boss and a perimeter;
   b) an aperture disposed in said perimeter;
   c) a cap mounted upon said boss; and
   d) a lever device extending from said cap, said lever device including an end in penetrable engagement with said aperture, said lever device further including a bar disposed at said one end to prevent disengagement of said one end with said aperture.

* * * * *